United States Patent
Hirota et al.

(10) Patent No.: US 8,046,231 B2
(45) Date of Patent: Oct. 25, 2011

(54) SPEECH PROCESSING APPARATUS AND CONTROL METHOD THEREOF

(75) Inventors: Makoto Hirota, Tokyo (JP); Toshiaki Fukada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 909 days.

(21) Appl. No.: 11/866,604

(22) Filed: Oct. 3, 2007

(65) Prior Publication Data

US 2008/0086306 A1    Apr. 10, 2008

(30) Foreign Application Priority Data

Oct. 6, 2006  (JP) ................. 2006-275729

(51) Int. Cl.
*G10L 11/00*  (2006.01)
*G10L 15/00*  (2006.01)

(52) U.S. Cl. ...................... 704/275; 704/231

(58) Field of Classification Search .......... 704/231–257, 704/270–278
See application file for complete search history.

(56) References Cited

U.S. PATENT DOCUMENTS

| | | | | |
|---|---|---|---|---|
| 6,370,238 B1 * | 4/2002 | Sansone et al. | | 379/88.23 |
| 6,751,594 B1 * | 6/2004 | Diehl et al. | | 704/275 |
| 2002/0115476 A1 * | 8/2002 | Padawer et al. | | 455/564 |
| 2004/0176958 A1 * | 9/2004 | Salmenkaita et al. | | 704/275 |
| 2005/0125234 A1 * | 6/2005 | Endo et al. | | 704/275 |

FOREIGN PATENT DOCUMENTS

| | | |
|---|---|---|
| JP | 2000-231398 | 8/2000 |
| JP | 2001-027540 A | 1/2001 |
| JP | 2001-216129 A | 8/2001 |
| JP | 2002-175175 A | 6/2002 |
| JP | 2003-005781 A | 1/2003 |
| JP | 2004-287702 A | 10/2004 |

* cited by examiner

*Primary Examiner* — Samuel G Neway
(74) *Attorney, Agent, or Firm* — Canon U.S.A., Inc. I.P. Division (57) ABSTRACT

An speech processing apparatus comprises a setting unit that sets an association between a speech recognition target vocabulary and the shortcut data for transitioning to a state to which a transition is made, when a user makes a transition to a state among the plurality of states using an operation input unit, an speech input unit that inputs an audio, a speech recognition unit that employs the speech recognition target vocabulary to recognize the audio that is input via the speech input unit, and a control unit that employs the shortcut data that corresponds to the speech recognition target vocabulary that is a recognition result of the speech recognition unit to transition to the state, in order to improve speech recognition accuracy for audio shortcuts, while also preserving the convenience of the audio shortcuts.

3 Claims, 11 Drawing Sheets

SPEECH PROCESSING APPARATUS AND CONTROL METHOD THEREOF

BACKGROUND OF THE INVENTION

1. Field of the Invention

The present invention relates to a speech recognition-based user interface technology.

2. Description of the Related Art

A user interface that incorporates speech recognition or speech synthesis is being applied to operating such devices as car navigation systems. One advantage of a user interface that employs speech recognition is that it facilitates a shortcut to an intended control screen. For example, a hierarchical menu is employed when controlling a device via only a graphical user interface (GUI). In such a circumstance, a user may find it necessary to go from a first screen to a second screen, a third screen, and a fourth screen, in order to execute a given function. When using a user interface that employs speech recognition, on the other hand, it is possible, for example, for the user to verbally input a prescribed spoken, that is, speech, command in the first screen that directs a transition to the fourth screen, and thus, transition directly from the first screen to the fourth screen.

It is necessary, however, for the user to have prior knowledge of the speech command that corresponds to the transition to the desired screen. Jpn. Patent Publication No. 2000-231398 (Cited Reference 1), for example, discloses a technology that stores a sequence of operations that the user performs, and notifies the user that a shortcut exists that corresponds to the sequence of operations thus stored. The technology allows the user to learn a speech shortcut in a simpler fashion than might otherwise be possible.

The technology disclosed in the Cited Reference 1, however, requires that a plurality of spoken shortcuts be stored in the device for all manner of sequences of operations. Each respective user will have need of different spoken shortcuts in actual use, and thus, speech shortcuts of which a given user has no need will be recorded therein. Consequently, executing speech recognition on the device will necessitate recognizing a significant quantity of speech that corresponds to a given speech shortcut, which, in turn, may lead to a deterioration in speech recognition accuracy.

SUMMARY OF THE INVENTION

The present invention was devised with the problems in mind, and has as an objective to offer a technology that is capable of improving speech recognition accuracy for speech shortcuts, while also preserving the convenience of the speech shortcuts.

According to one aspect of the present invention, a speech processing apparatus adapted to possess a plurality of states, and set a shortcut data that provides a shortcut to each respective state, comprises: a setting unit adapted to set an association between a speech recognition target vocabulary and the shortcut data for transitioning to a state to which a transition is made, when a user makes a transition to a state among the plurality of states using an operation input unit; an speech input unit adapted to input a speech; a speech recognition unit adapted to recognize the speech that is input via the speech input unit using the speech recognition target vocabulary; and a control unit adapted to transition to the state using the shortcut data that corresponds to the speech recognition target vocabulary that is a recognition result of the speech recognition unit.

According to another aspect of the present invention, a control method of a speech processing apparatus adapted to possess a plurality of states, and set a shortcut data that provides a shortcut to each respective state, comprises the steps of: setting an association between a speech recognition target vocabulary and the shortcut data for transitioning to a state to which a transition is made, when a user makes a transition to a state among the plurality of states using an operation input unit; inputting a speech; recognizing the speech input by the input step using the speech recognition target vocabulary; and transiting to the state using the shortcut data that corresponds to the speech recognition target vocabulary that is a recognition result of the speech recognition unit.

According to still another aspect of the present invention, a program, stored on a computer-readable storage medium, for executing on a computer a control method of a speech processing apparatus adapted to possess a plurality of states, and set a shortcut data that provides a shortcut to each respective state, comprises the steps of: setting an association between a speech recognition target vocabulary and the shortcut data for transitioning to a state to which a transition is made, when a user makes a transition to a state among the plurality of states using an operation input unit; inputting an speech; recognizing the speech input by the input step using the speech recognition target vocabulary; and transiting to the state using the shortcut data that corresponds to the speech recognition target vocabulary that is a recognition result of the speech recognition unit.

According to the present invention, it is possible to offer a technology that is capable of improving speech recognition accuracy for speech shortcuts, while also preserving the convenience of the speech shortcuts.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Hereinafter follows a detailed description of preferred embodiments, with reference to the attached drawings. The configuring elements disclosed in the embodiments are examples, and the scope of the present invention is not limited thereto.

First Embodiment

The following is a description of an example of a personal digital assistant according to a first embodiment of a speech processing apparatus according to the present invention.

Overview

A configuration is made with regard to the personal digital assistant wherein a speech shortcut to an operation screen that corresponds to each respective function is registered when a user arrives at the operation screen. Consequently, a shortcut to an operation screen that corresponds to a function that the user does not use is not registered. Such a configuration allows reducing the number of registered speech shortcuts. It is thus possible to offer a technology that is capable of improving speech recognition accuracy for speech shortcuts, while also preserving the convenience of the speech shortcuts.

Configuration of the Apparatus

Figure 1:
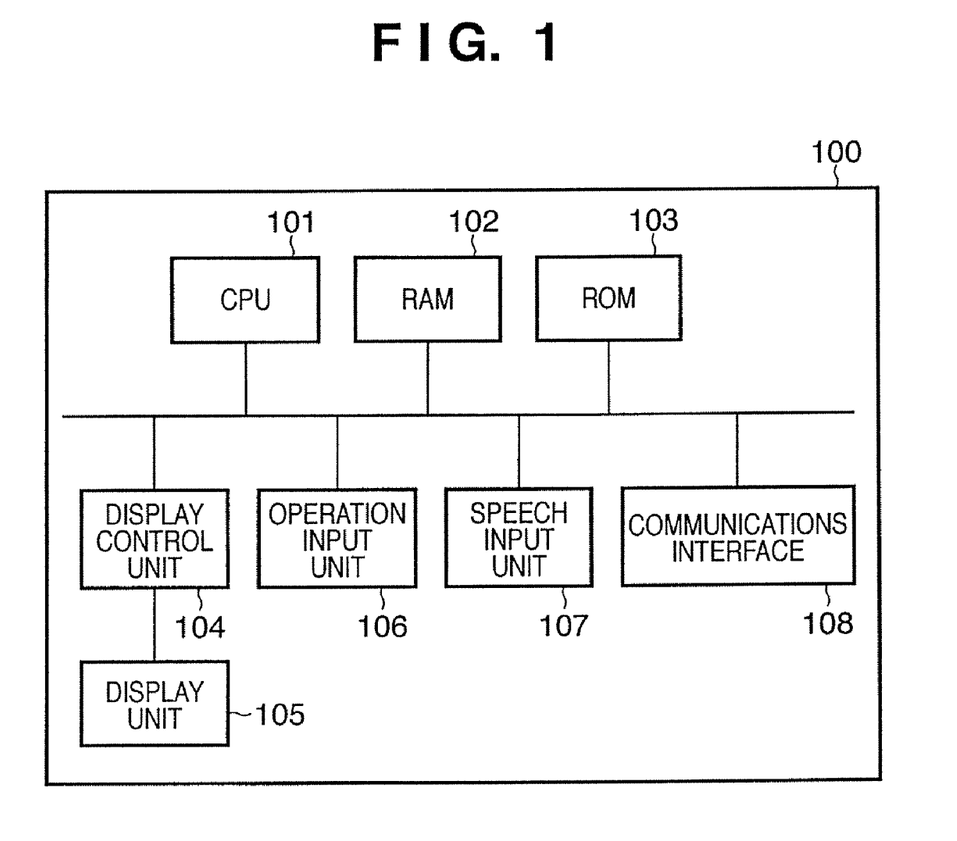
FIG. 1 is an internal configuration of a personal digital assistant according to a first embodiment.

FIG. 1 is an internal configuration of the personal digital assistant according to the first embodiment. A personal digital assistant 100 is an apparatus that possesses a variety of application functions, such as a web browser, e-mail, and a schedule manager.

Reference numeral 101 is a CPU, which executes a variety of functions, to be described hereinafter, by executing a variety of application programs that are stored in a ROM 103. Reference numeral 102 is a RAM, which temporarily stores the program or the data that is loaded from the ROM 103. The RAM 102 is also used as a space wherein the CPU 101 executes the variety of programs. Reference numeral 103 is a ROM, which stores such information as an operating system (OS), the various applications, a control program, and the data. The present circumstance presumes that the ROM 103 is a rewritable element, such as an EEPROM or a flash memory.

Reference numeral 104 is a display control unit, which performs a control process for displaying such elements as images or text on a display unit 105. Reference numeral 105 is a display unit, which displays a variety of information, in such elements as graphics or text, for an operator. A technology such as a liquid crystal display (LCD) may be employed as the display unit 105.

Reference numeral 106 is an operation input unit, which requests a manual input to the personal digital assistant 100 by the user. In more concrete terms, the operation input unit 106 may be such as a hardware key 106a or a software key 106b. Reference numeral 107 is an speech input unit, which requests a spoken, that is, a speech, input to the personal digital assistant 100 by the user. In more concrete terms, the speech input unit may be such as a microphone.

Reference numeral 108 is a communications interface, which performs communications between the personal digital assistant 108 and an apparatus that is external thereto. An example of such a communications interface would be a Wi-Fi, that is, a wireless LAN, interface.

Figure 2:
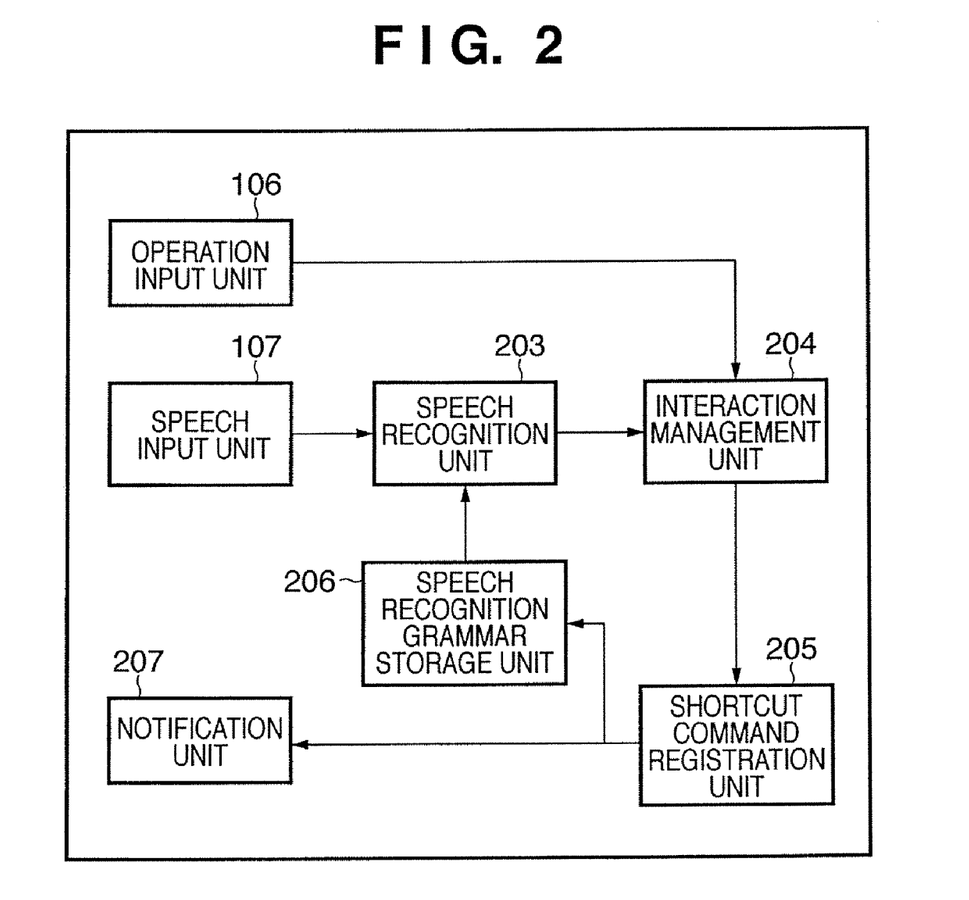
FIG. 2 is a block diagram of internal functions that are affiliated with a speech input user interface of the personal digital assistant according to the first embodiment.

FIG. 2 is a block diagram of internal functions that are affiliated with a speech input user interface of the personal digital assistant according to the first embodiment. The following function units are implemented when the CPU 101 executes the programs that are stored in the ROM 103.

Reference numeral 203 is a speech recognition unit, which is a function unit that recognizes a speech that is input via the speech input unit 107. Hereinafter, the speech recognition unit 203 is presumed to output a result of the recognition, in accordance with the speech that is input via the speech input unit 107 and a speech recognition target vocabulary, in a text form that corresponds thereto. The format by which the result of the recognition is output is irrelevant, however, provided that the speech that is input via the speech input unit 107 is identified. It would be possible to use an established technique for the speech recognition function itself, and a description thereof will thus be omitted herein.

Reference numeral 204 is an interaction management unit, which is a function that manages a control of the user interface of the personal digital assistant 100. The interaction management unit 204 manages a GUI operation screen that is displayed on the display unit 105, in accordance with input via either the operation input unit 106 or the speech input unit 107.

Reference numeral 205 is a shortcut command registration unit, which is a function unit that associates the speech that is input via the speech input unit 107 with a shortcut data for transitioning to a prescribed status. Details of the operation of the shortcut command registration unit 205 will be described hereinafter.

Reference numeral 206 is a speech recognition grammar storage unit, which is a function unit that stores and manages the shortcut that is registered by the shortcut command registration unit 205.

Reference numeral 207 is a notification unit, which is a function unit for notifying a user that the shortcut command registration unit 205 has registered the shortcut. In more concrete terms, such a notification would be implemented by either a screen display that is output to the display unit 105, or an audio output via a speaker (not shown).

Figure 3:
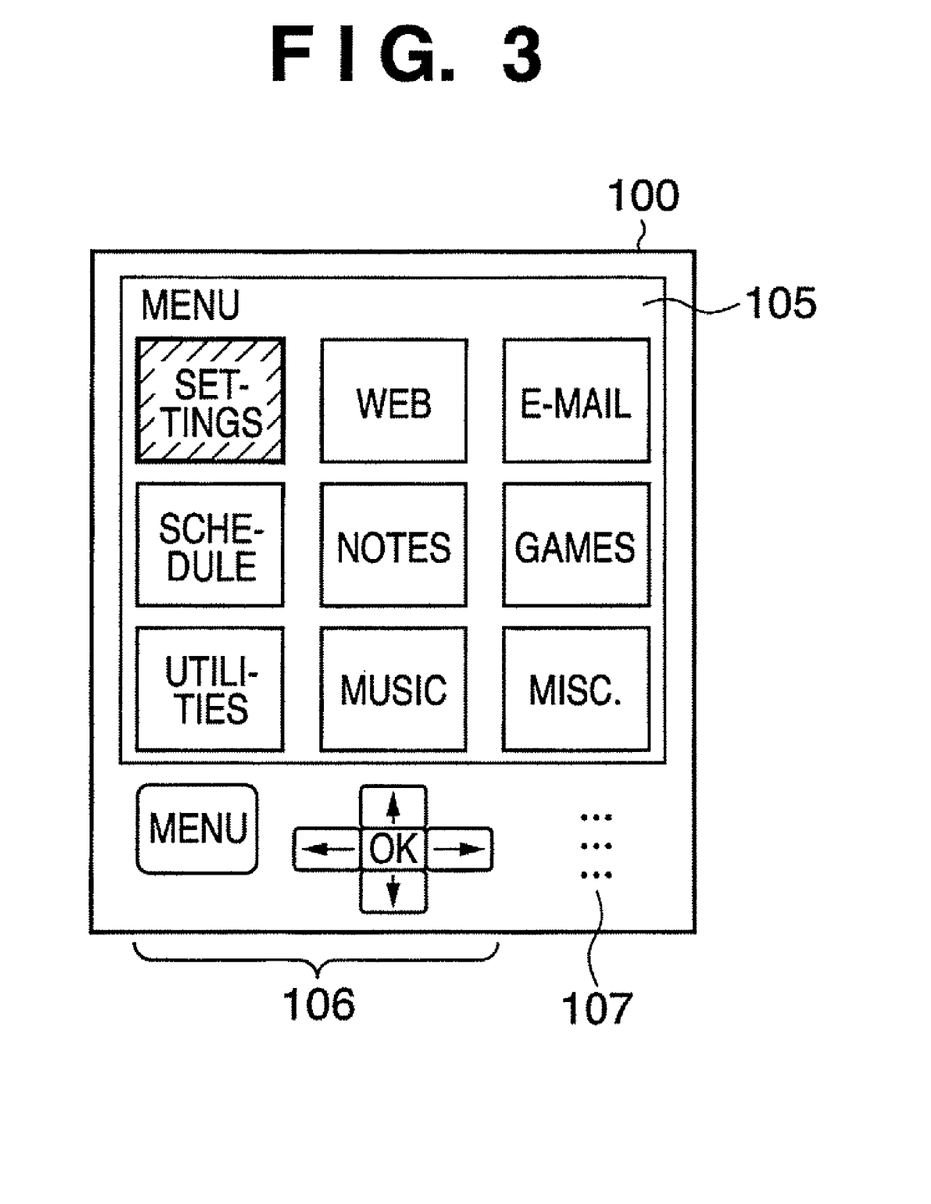
FIG. 3 depicts an example of an external appearance and a GUI of the personal digital assistant according to the first embodiment.

FIG. 3 depicts an example of an external appearance and a GUI of the personal digital assistant according to the first embodiment. The present example depicts a display on the display unit 105 of a main menu, which constitutes a root level of a hierarchical menu.

The personal digital assistant 100 comprises a liquid crystal display that is the display unit 105, a hardware key that is the operation input unit 106, and a microphone that is the speech input unit 107. FIG. 3 depicts the following hardware keys: a menu key, four arrow keys, arranged in a cross configuration, that point up, down, left, and right, and an OK key. Pressing the menu key brings up the main menu on the display unit 105, with an input focus on an icon in an upper left-hand corner thereof.

Operation of the Apparatus

Figure 5A:
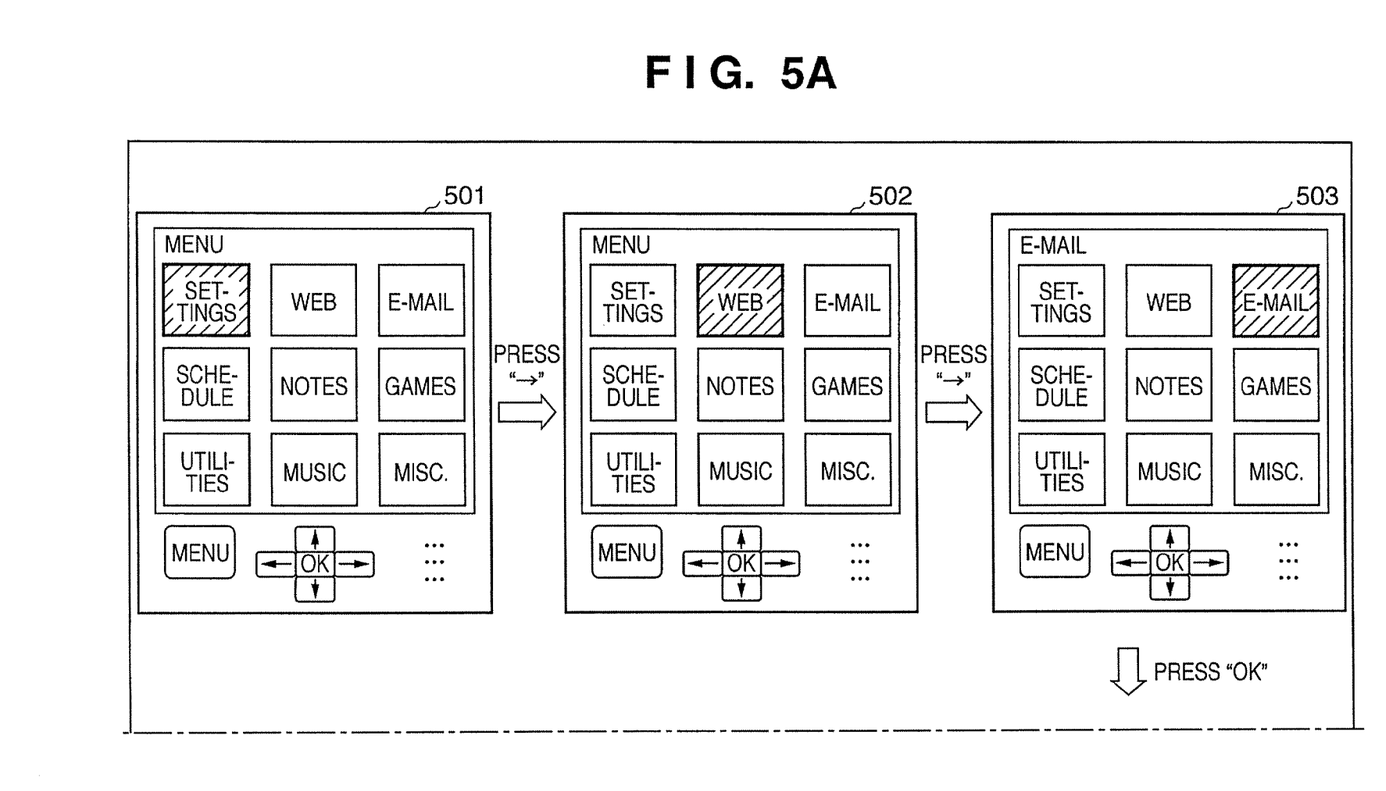
FIGS. 5A and 5B depict examples display of moving among screens in hardware.
Figure 5B:
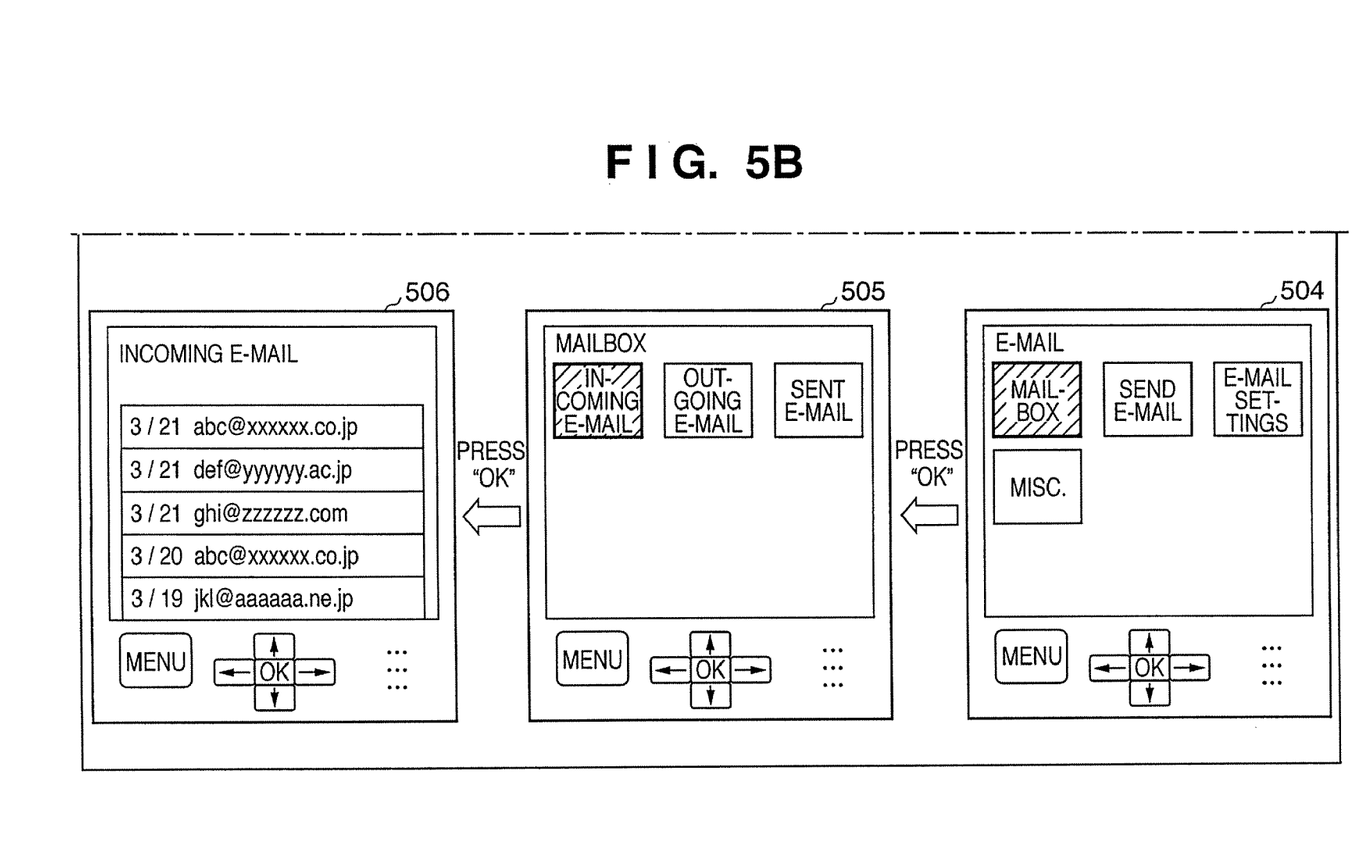

FIGS. 5A and 5B depict examples display of moving among screens by way of hardware keys from the main menu to an incoming e-mail operation screen. The user is able to arrive at the incoming e-mail operation screen by way of pressing the arrow keys and the OK key a plurality of times.

In more concrete terms, in a condition 501 wherein the main menu is displayed in a manner similar to the display depicted in FIG. 3, an initial press of the right arrow key moves the input focus of the icon to the right of the display, per reference numerals 502 and 503. Pressing the OK button moves to a submenu screen that corresponds to the icon whereupon the focus is, per reference numerals 504, 505, and 506. Consequently, the user reaches the incoming e-mail operation screen. The present circumstance describes an example of a status that displays each respective operation screen.

Figure 4:
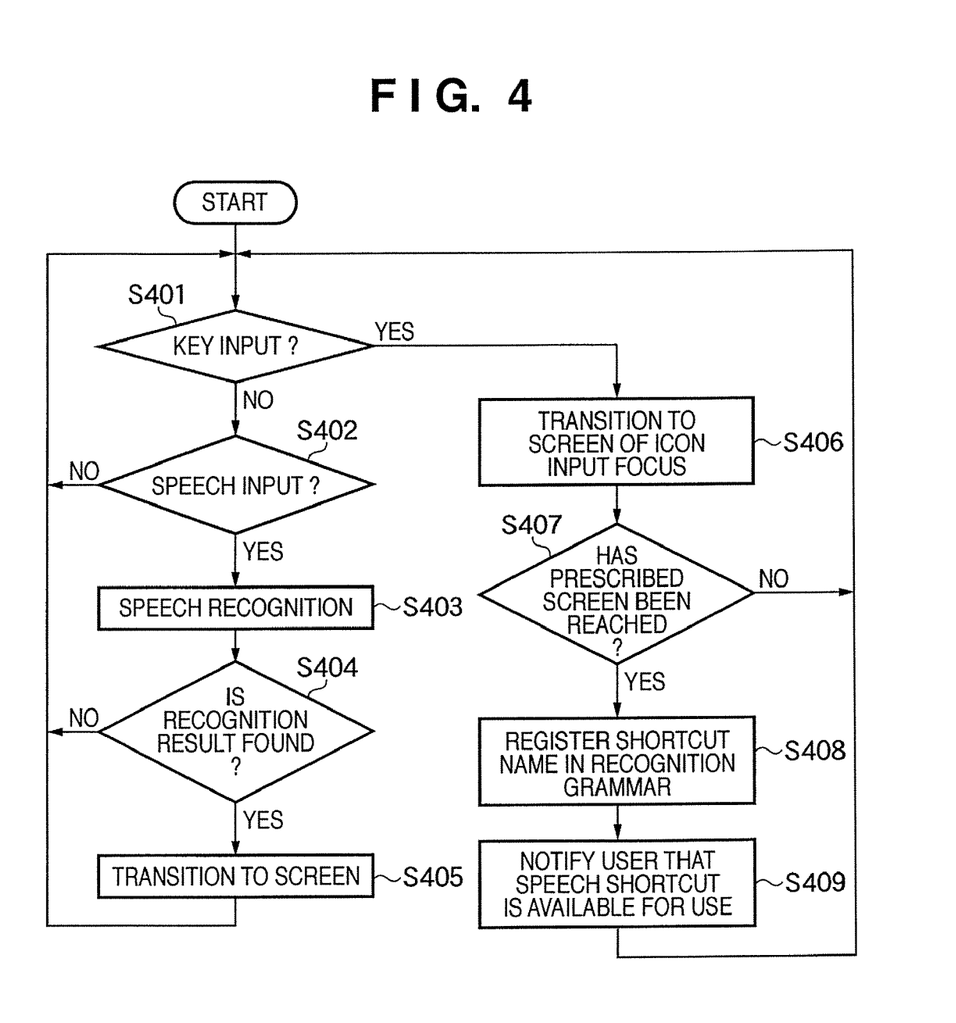
FIG. 4 is a flowchart of operations that are affiliated with the speech input user interface of the personal digital assistant according to the first embodiment.

FIG. 4 is a flowchart of operations that are affiliated with the speech input user interface of the personal digital assistant according to the first embodiment. The operations of each respective step hereinafter are implemented when the CPU 101 executes the programs that are stored in the ROM 103.

In step S401, a check is made as to whether or not a hardware key input has been made by the user. In step S402, the system checks whether or not a speech input has been made by the user. If the hardware key input has been made, the process proceeds to step S406. If the speech input has been made, the process proceeds to step S403. If no input is made from either source, the process returns to step S401 and repeats the check of the input.

In step S406, the system executes a move of the input focus of the icon across the screen in response to the arrow keys, as well as a transition to the screen that corresponds to the icon, in response to the OK key.

In step S407, a determination is made as to whether or not the prescribed operation screen has been reached, as per the result obtained in step S406. In the present circumstance, the prescribed operation screen refers to an application, such as the incoming e-mail, and typically means the operation screen that corresponds to a vicinity of a lower level, that is, a final menu, of the hierarchical menu. If the prescribed operation screen has been reached, the process proceeds to step S408, if the prescribed operation screen has not been reached, the process returns to step S401. The process also returns to step S401 in the event that the shortcut that corresponds to the prescribed operation screen has been registered in the speech recognition grammar storage unit 206, even if the prescribed operation screen has been reached.

In step S408, the shortcut text string that corresponds to the operation screen that is reached in step S407 is registered in the speech recognition grammar storage unit 206. For example, a name that is displayed in such as a title bar of the operation screen is registered as the shortcut text string; in the present example, the name "incoming e-mail" is registered as the shortcut text string. The association between the shortcut text string "incoming e-mail" and the shortcut data for transitioning to the incoming e-mail operation screen is thus set. While the present example describes a configuration that registers the shortcut text string when the operation screen is reached, the present invention is not limited thereto, and a configuration would be permissible wherein the shortcut text string and the shortcut data are pre-associated and stored in an inactive status, and made active when the operation screen is reached. Making the shortcut text string active thus makes the shortcut text string responsive to speech recognition.

In step S409, the user is notified of the shortcut text string that is registered in step S408, using such as an image of the shortcut text string being displayed on the display unit 105. As a consequence, the user is able to recognize that thereafter, a shortcut function will be available for use that directly moves to the incoming e-mail operation screen when the user issues a speech command, that is, makes a speech input, of "incoming e-mail" upon an arbitrary screen. It would also be permissible to notify the user with an audio output from a speaker (not shown).

In step S403, speech recognition for the speech that is input in step S402 is executed by the speech recognition unit 203. The shortcut text string that matches the result of the speech recognition is searched for in the speech recognition grammar storage unit 206.

If a matching shortcut text string in step S403 is found in step S404, the process proceeds to step S405. If, on the other hand, no matching shortcut text string is found, the process returns to step S401. The process also returns to step S401 after the user is notified with a message to the effect that "no such shortcut has been registered."

In step S405, the system transfers to the operation screen that corresponds to the shortcut text string that is found in step S404.

Given the personal digital assistant according to the first embodiment, a speech shortcut is registered that corresponds to an operation screen to which the user has previously navigated via the keys. Doing so allows transitioning directly to the operation screen by verbalizing the shortcut text string that corresponds to the screen, as well as reducing the number of key operations. The user is also notified when the shortcut text string is registered as a shortcut, thus allowing the user to know with ease what verbalization to use in order to transition directly to the screen. Only the shortcut text string of the screen to which the user has navigated is registered in the speech recognition grammar storage unit 206, which has a benefit of reducing the vocabulary that is required for the shortcut text string, and of lowering the rate of errors in recognition.

Variant Embodiments

Figure 6:
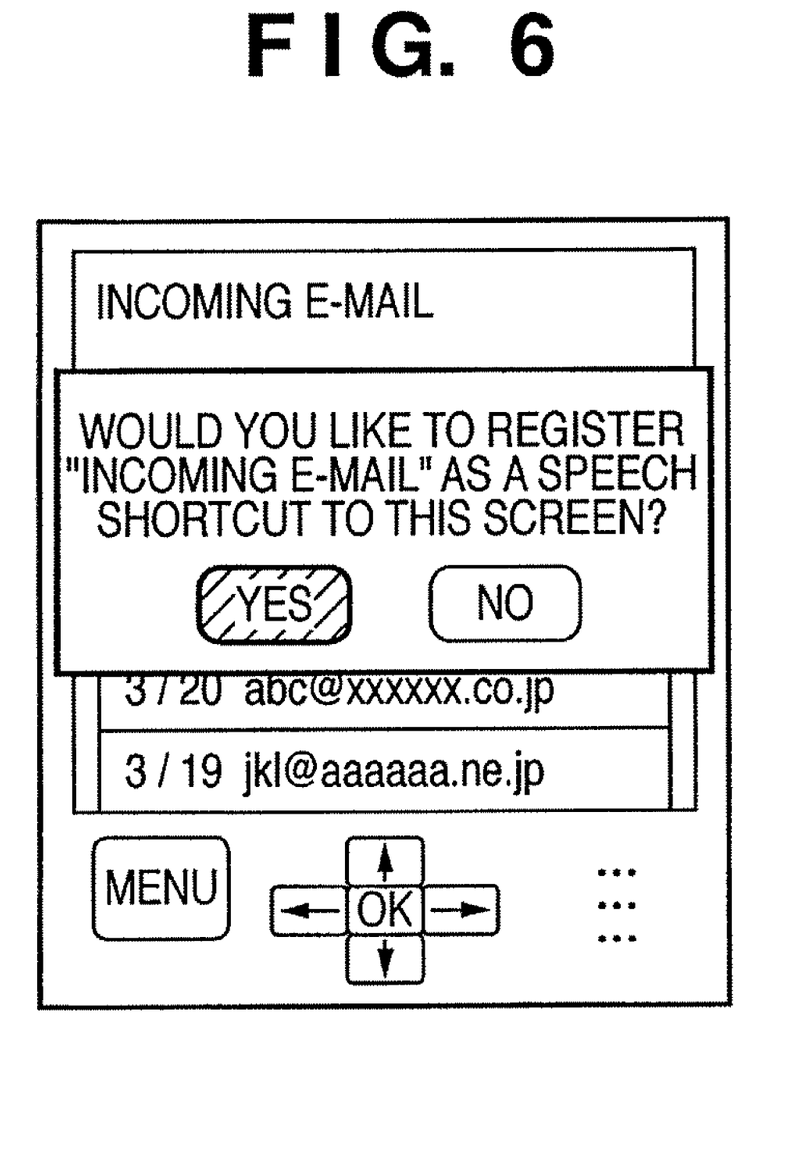
FIG. 6 depicts an example of a dialog box that requests an acceptance or a rejection of a registration.

Thus far, it has been described that the shortcut text string is automatically registered in step S408. It would also be permissible to query the user as to whether or not to register the shortcut text string, and only to register the shortcut text string of the user gives approval to do so. For example, it would be permissible to display a dialog box such as is depicted in FIG. 6, and to register the shortcut text string only if the user selects the OK button.

It would also permissible to allow the user to register a name that corresponds to the registered shortcut command.

Figure 7:
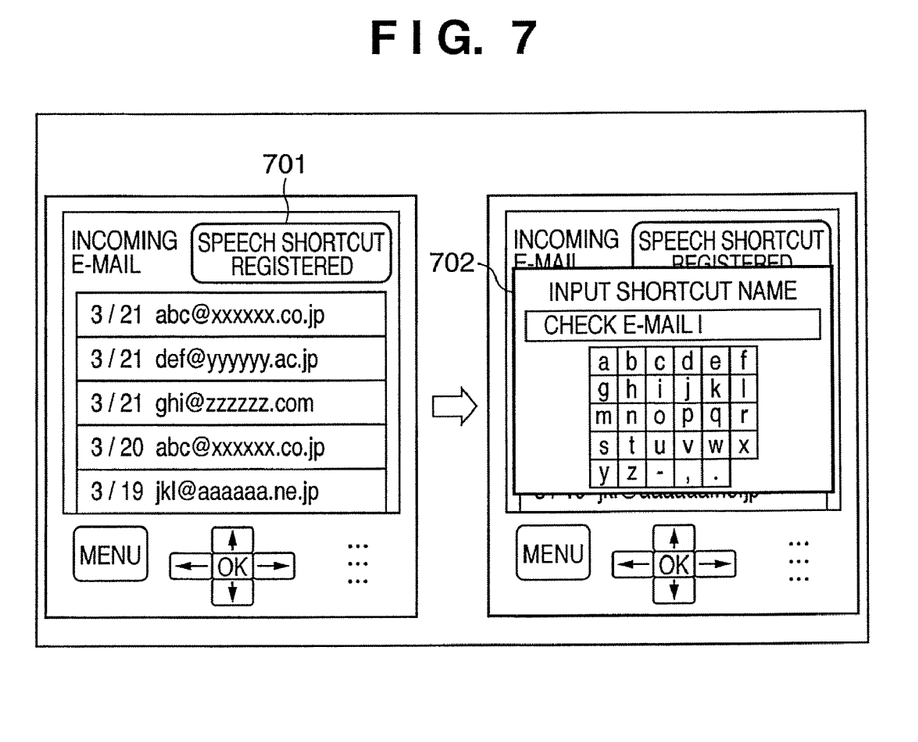
FIG. 7 depicts an example of a text character input panel that requests a shortcut text character string via a device input unit.

As depicted in FIG. 7, it would be permissible to allow the user to personally register a shortcut text string that the user could easily remember. For example, it would be permissible to associate a text string "check e-mail" with the incoming e-mail operation screen, instead of the "incoming e-mail" text string. It would thus be permissible, for example, to display a text string input panel such as reference numeral 702, and allow the user to input the text therefrom to set the shortcut text string. Such a configuration allows the user to set the shortcut text string without being limited to the menu name, that is, the name that is displayed in the title bar of the operation screen. Doing so has the benefit of allowing the user to memorize the registered shortcut more easily.

Figure 8:
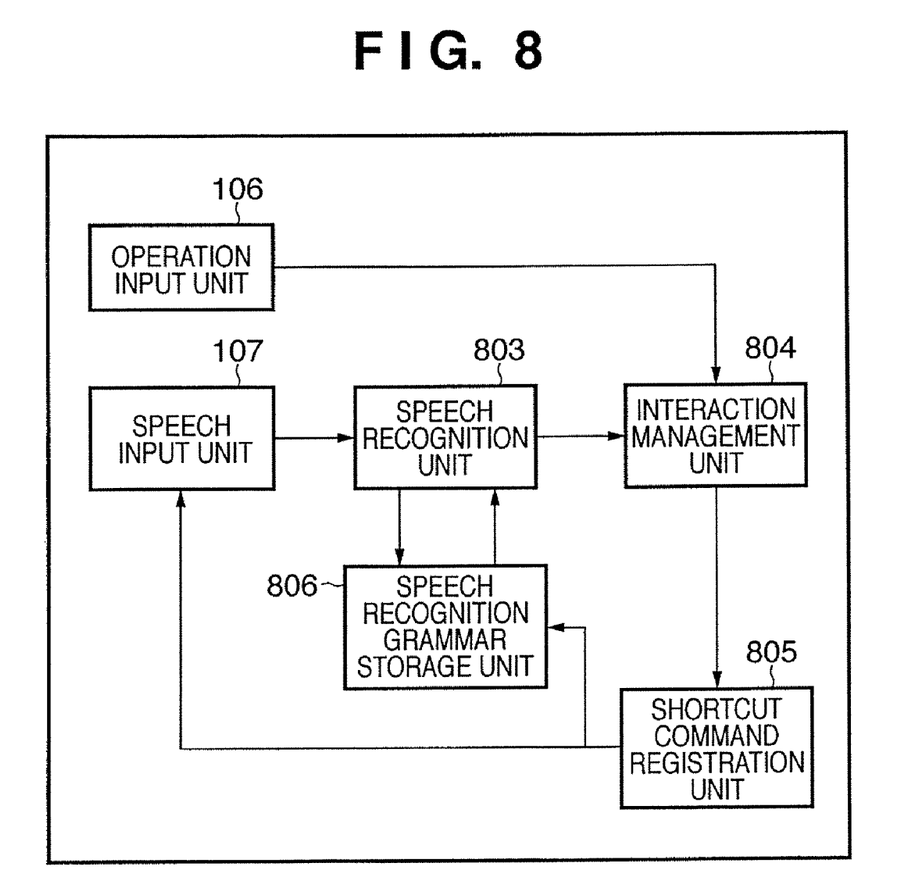
FIG. 8 is a block diagram of internal functions that are affiliated with a speech input user interface of a personal digital assistant according to a variant embodiment.
Figure 9:
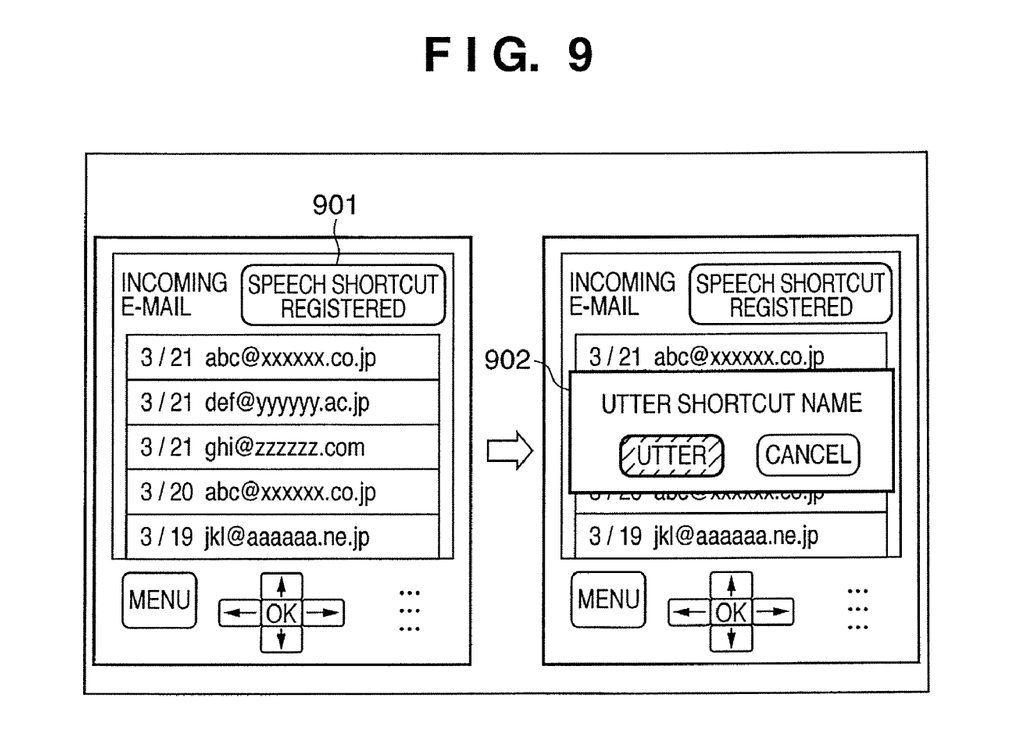
FIG. 9 depicts an example of a text character input panel that requests a shortcut text character string via an speech input unit.

It would be permissible to use a speech input that employs speech recognition for inputting of the shortcut text string to be registered. FIG. 8 is a block diagram of internal functions that are affiliated with a speech input user interface of a personal digital assistant according to a variant embodiment. It would thus be permissible, for example, to allow the user to set the shortcut text string via a speech input panel such as is depicted in FIG. 9, reference numeral 902.

Whereas the description according to the first embodiment output the speech recognition result of the speech recognition unit 203, it would be permissible to register the speech data as is, or in a characteristic amount data format that is extracted therefrom. It would thus be permissible to extract the registration data that is the closest match, by comparing the spoken command for the shortcut with the registration data. It would be possible to use existing technology for such purposes as inputting the shortcut text string via speech recognition, and thus, a detailed description will not be provided herein.

When the prescribed operation screen is reached for the first time, a shortcut to the operation screen is registered, as described according to the first embodiment. It would also be permissible to configure the registration of the shortcut to be triggered based on a number of times that the prescribed operation screen is reached or the frequency thereof, that is, how many times the prescribed operation screen is reached within a given unit of time. Such a configuration would register shortcuts only for the operation screens that the user frequently visits. It would also be possible to reduce the chance of mistakenly registering shortcuts for operation screens that the user reached unintentionally, whether by a mistake in the operation of the unit or for another reason. It is thus possible to further reduce the number of registered shortcuts, which allows an additional deterioration in the rate of recognition.

Figure 10:
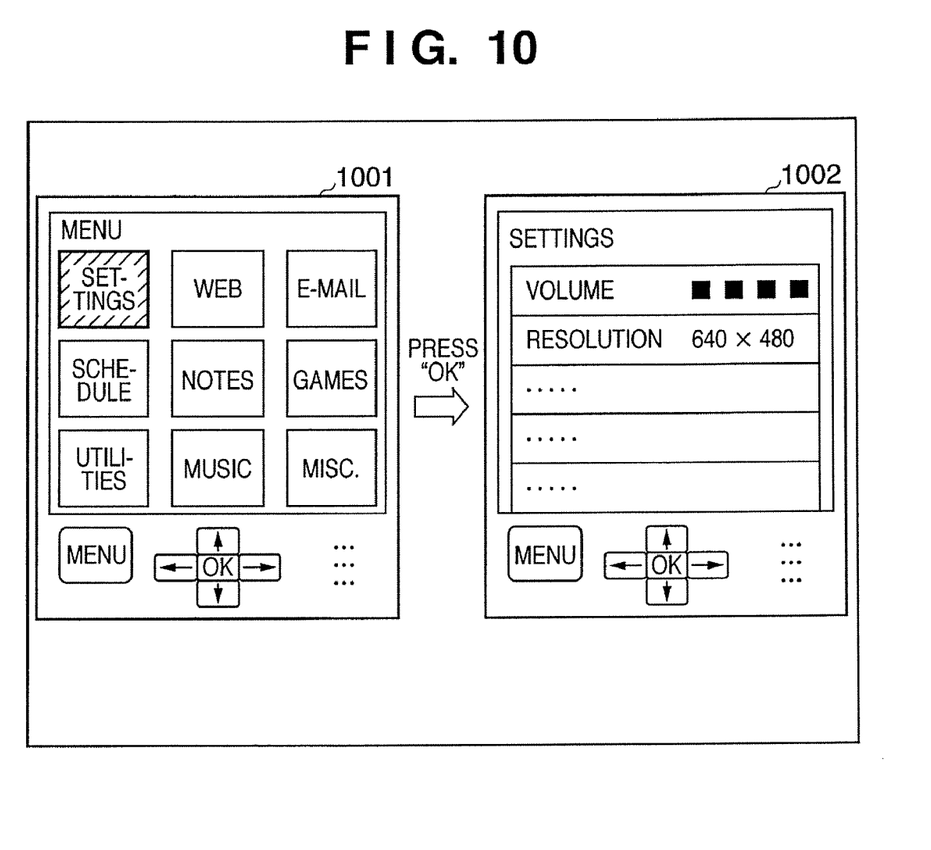
FIG. 10 depicts an example of an operation screen for a shallow menu hierarchy.

As per the screen 506 in FIGS. 5B, registering the shortcut to transition from the main menu 501 to the operation screen 506 that is three layers down is an effective menu shortcut. A one-level menu transition, such as going from a top menu 1001 to a screen 1002, as depicted in FIG. 10, may be effected with few key operations, and registering a shortcut in such a circumstance is of little significance. It would thus be permissible to make a configuration that forestalls the shortcut registration process for screens that can be reached with a few keypresses or that are close to the main menu.

Second Embodiment

The present invention has been applied to a single device, the personal data assistant, according to the first embodiment and the variant embodiments. It would also be permissible to apply the present invention to a system that is configured of a plurality of devices. The following is a description of a telephone speech interactive system that is usable as a call center system according to a second embodiment.

Prerequisite System Operation

The speech interactive system is configured of a telephone device that is installed in the user's residence and is capable of transmitting a tone signal, and an information processing apparatus that is installed in the call center. The following is a description a system operation that is a prerequisite according to the second embodiment.

Using the telephone device, the user calls the call center, and a speech interaction that is configured of a hierarchical menu such as the following ensues:
1. Center: Press "1" for a product inquiry. Press "2" for a breakdown or repair inquiry.
2. User: Presses "1", generates a tone signal that corresponds to "1".
3. Center: Press "1" for an inquiry about a camera. Press "2" for an inquiry about a printer.
4. User: Presses "2", generates a tone signal that corresponds to "2".
5. Center: Please say the name of the printer model.
6. User: Speaks name of printer model.
7. Center: Please hold for an operator. (The system processes the transfer to the operator.) Operation with Regard to the System According to the Second Embodiment.

When using a speech interactive system such as the foregoing, when in interaction status 7, for example, the following would occur:

7. Center: Please hold for an operator. Press "#" to register a shortcut for the steps you have taken thus far. Otherwise, please continue to hold. (The system processes the transfer to the operator.)

When the user presses the "#" button, a tone signal that corresponds to "1" is generated, and the center registers a text string that corresponds to the printer model name in step 6 as a shortcut text string. The center provides the user with a verbal notification thereof. Thereafter, when the user calls the center, it will be possible to perform an interaction such as the following:
1'. Center: Press "1" for a product inquiry. Press "2" for a breakdown or repair inquiry.
2'. User: Speaks name of printer model.
3'. Center: Please hold for an operator. (The system processes the transfer to the operator.)

Per the foregoing, it is possible to use a shortcut function to three steps versus the seven steps that were initially required, according to the second embodiment.

Other Embodiments

The present invention is also achieved by supplying a program that implements the functions according to the embodiments to a system or an apparatus, either directly or remotely, and having the program code thus supplied loaded onto and executed by the system or the apparatus. Accordingly, the program code itself that is installed on a computer in order to implement the functions of the present invention is encompassed within the technical scope of the present invention.

In such a circumstance, the form of the program is irrelevant, provided that the function of the program is present. The form thereof may be such as object code, a program that is executed by an interpreter, or a script that is supplied to the operating system.

A recording medium for supplying the program may be such as a floppy disk, a hard drive, an optical disc, that is, a CD or a DVD, a magneto-optical disk, a magnetic tape, a non-volatile memory card, or a ROM, for example.

The functions according to the embodiments are implemented by the computer executing the loaded program. It would also be possible for the functions according to the embodiments to be implemented by a process that is performed in whole or in part by the operating system or other software running on the computer, in accordance with the instructions of the program.

The program that is loaded from the recording medium may be written to a memory that is included on either an expansion board that is inserted into the computer, or an expansion unit that is attached to the computer. The functions according to the embodiments are implemented by a CPU that is included on either the expansion board or the expansion unit executing the loaded program, performing a process in whole or in part, in accordance with the instructions of the program.

While the present invention has been described with reference to exemplary embodiments, it is to be understood that the invention is not limited to the disclosed exemplary embodiments. The scope of the following claims is to be accorded the broadest interpretation, so as to encompass all such modifications and equivalent structures and functions.

This application claims the benefit of Japanese Patent Application No. 2006-275729, filed Oct. 6, 2006, which is hereby incorporated by reference herein in its entirety.

What is claimed is:

1. A speech processing apparatus adapted to display a plurality of screens of a hierarchical menu and set shortcut data that provides a shortcut to each respective screen, the speech processing apparatus comprising:
- a selecting unit adapted to select a screen from among the plurality of screens;
- a determination unit adapted to determine whether the selected screen corresponds to a level which is deeper than a predetermined depth from a root level of the hierarchical menu;
- a storing unit adapted to register, in a case where it is determined that the selected screen corresponds to the level which is deeper than the predetermined depth, a speech recognition target vocabulary corresponding to the selected screen to a speech recognition grammar, and to associate and store the registered speech recognition target vocabulary and a shortcut data for transitioning to the selected screen;
- a speech input unit adapted to input a speech;
- a speech recognition unit adapted to recognize the speech that is input via the speech input unit using the speech recognition grammar; and
- a control unit adapted to display, by using the shortcut data corresponding to the recognized speech recognition target vocabulary, the screen corresponding to the recognized speech recognition target vocabulary,
- wherein, in a case where it is determined that the selected screen does not correspond to the level which is deeper than the predetermined depth, the storing unit does not register the speech recognition target vocabulary corresponding to the selected screen, and does not associate and store the registered speech recognition target vocabulary and the shortcut data for transitioning to the selected screen.

2. A method for a speech processing apparatus adapted to display a plurality of screens of a hierarchical menu and set shortcut data that provides a shortcut to each respective screen, the method comprising:
- selecting screen from among the plurality of screens;
- determining whether the selected screen corresponds to a level which is deeper than a predetermined depth from a root level of the hierarchical menu;
- registering, in a case where it is determined that the selected screen corresponds to the level which is deeper than the predetermined depth, a speech recognition target vocabulary corresponding to the selected screen to a speech recognition grammar, and associating and storing the registered speech recognition target vocabulary and a shortcut data for transitioning to the selected screen;
- inputting a speech;
- recognizing the input speech using the speech recognition grammar; and
- displaying, using a control unit and by using the shortcut data corresponding to the recognized speech recognition target vocabulary, the screen corresponding to the recognized speech recognition target vocabulary,
- wherein, in a case where it is determined that the selected screen does not correspond to the level which is deeper than the predetermined depth, registering does not include registering the speech recognition target vocabulary corresponding to the selected screen, and does not include associating and storing the registered speech recognition target vocabulary and the shortcut data for transitioning to the selected screen.

3. A non-transitory computer-readable storage medium storing a program that causes a speech processing apparatus adapted to perform a method to display a plurality of screens of a hierarchical menu and set shortcut data that provides a shortcut to each respective screen, the method comprising:
- selecting a screen from among the plurality of screens;
- determining whether the selected screen corresponds to a level which is deeper than a predetermined depth from a root level of the hierarchical menu;
- registering, in a case where it is determined that the selected screen corresponds to the level which is deeper than the predetermined depth, a speech recognition target vocabulary corresponding to the selected screen to a speech recognition grammar, and associating and storing the registered speech recognition target vocabulary and a shortcut data for transitioning to the selected screen;
- inputting a speech;
- recognizing the input speech using the speech recognition grammar; and
- displaying, using a control unit and by using the shortcut data corresponding to the recognized speech recognition target vocabulary, the screen corresponding to the recognized speech recognition target vocabulary,
- wherein, in a case where it is determined that the selected screen does not correspond to the level which is deeper than the predetermined depth, registering does not include registering the speech recognition target vocabulary corresponding to the selected screen, and does not include associating and storing the registered speech recognition target vocabulary and the shortcut data for transitioning to the selected screen.

* * * * *